F. P. HOFFMAN.
ROLL PINNING MACHINE.
APPLICATION FILED JULY 6, 1909.
954,186.
Patented Apr. 5, 1910.
3 SHEETS—SHEET 3.
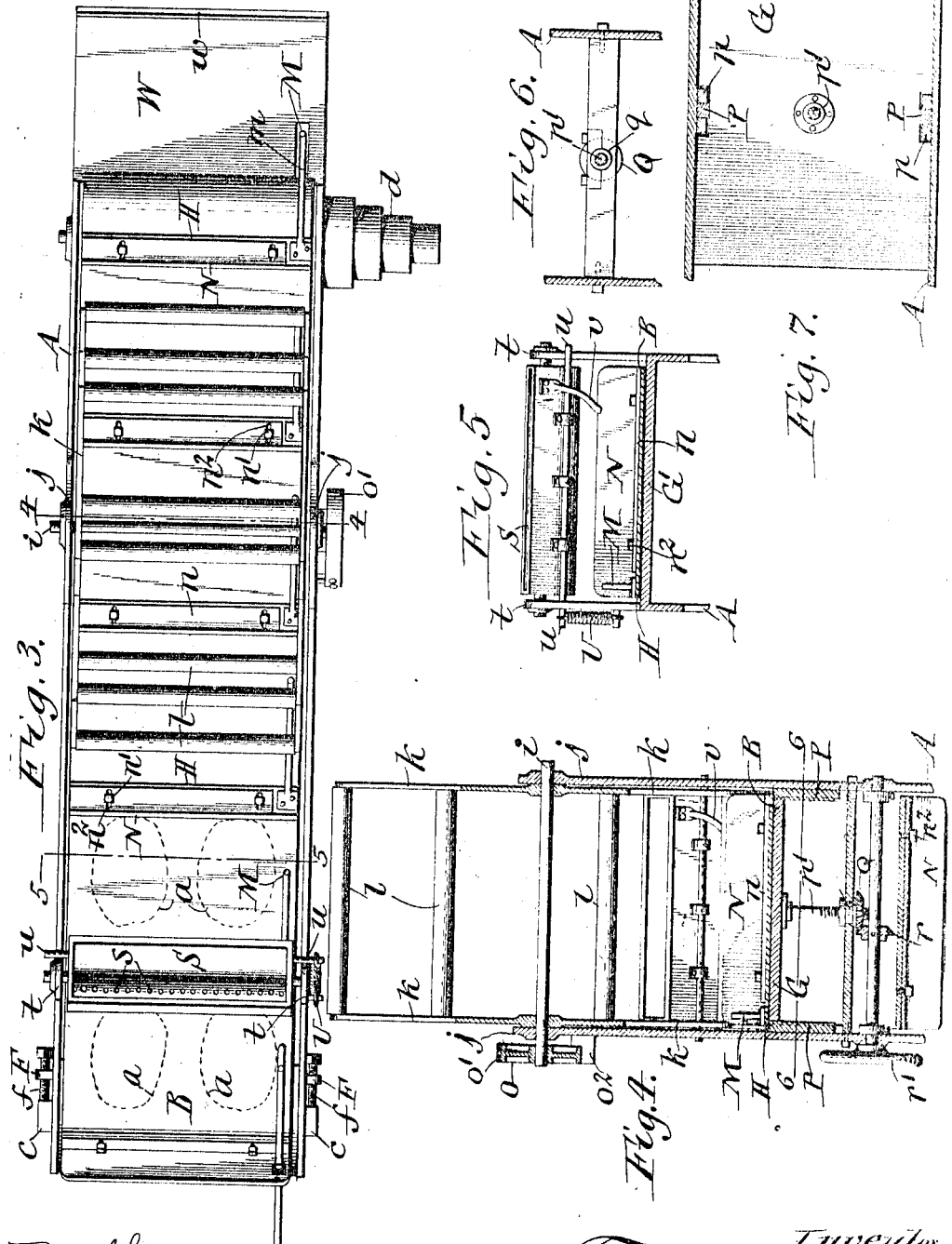

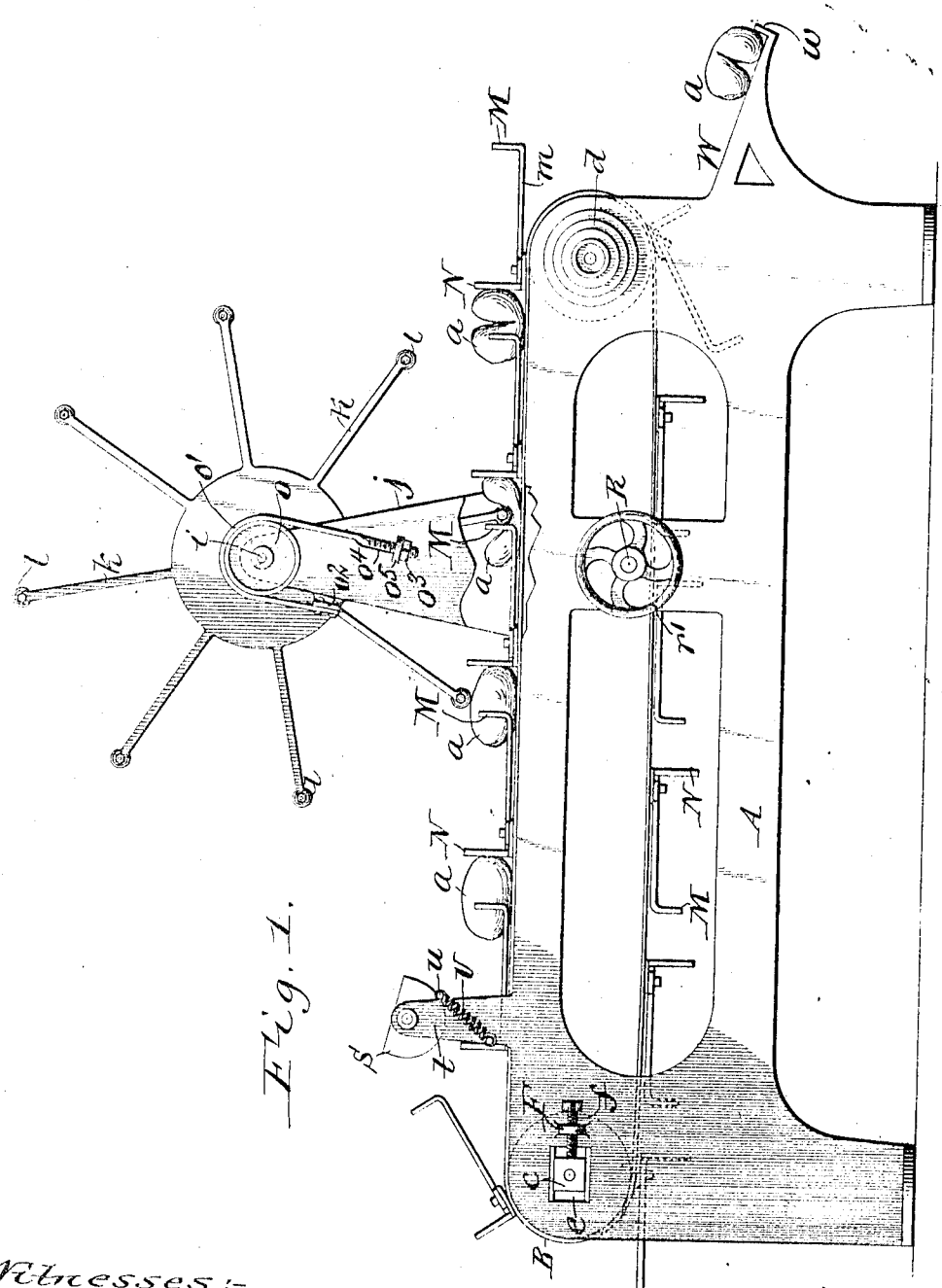

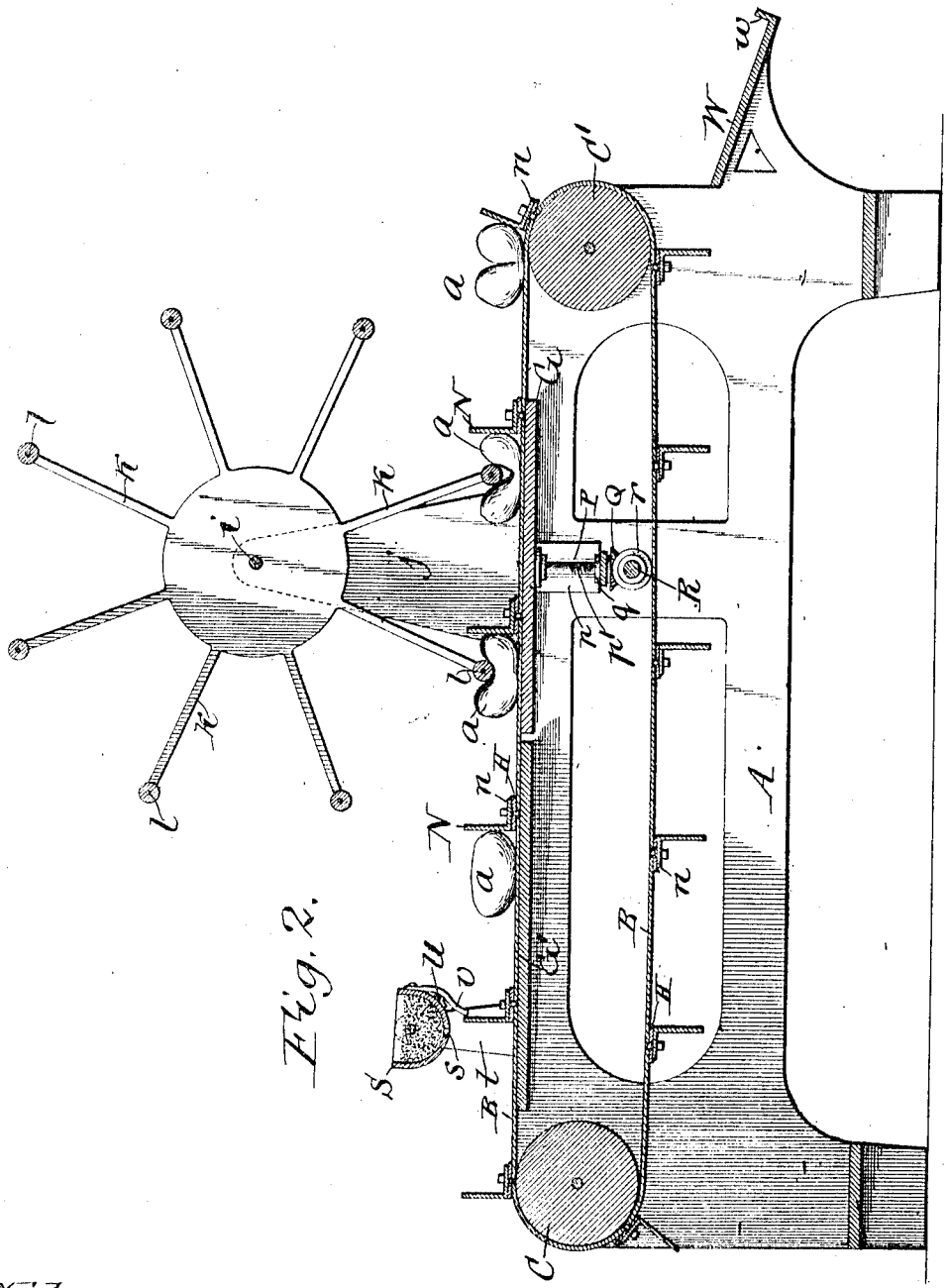

UNITED STATES PATENT OFFICE.

FRED P. HOFFMAN, OF BUFFALO, NEW YORK.

ROLL-PINNING MACHINE.

954,186.

Specification of Letters Patent. Patented Apr. 5, 1910.

Application filed July 6, 1909. Serial No. 506,004.

*To all whom it may concern:*

Be it known that I, FRED P. HOFFMAN, a citizen of the United States, residing at Buffalo, in the county of Erie and State of New York, have invented a new and useful Improvement in Roll-Pinning Machines, of which the following is a specification.

This invention relates to a machine for producing longitudinal grooves or indentations in the upper sides of breakfast rolls before the same are baked which operation is known in the bakers' trade as pinning, because it has heretofore been done by means of a hand operated rolling pin.

It is the object of this invention to produce a simple and efficient machine whereby the operation of pinning the lumps or balls of dough, which are subsequently baked into rolls, may be effected expeditiously, uniformly and with a minimum expenditure of power.

In the accompanying drawings consisting of 3 sheets: Figure 1 is a side elevation of my roll pinning machine. Fig. 2 is a vertical longitudinal section of the same. Fig. 3 is a top plan view thereof. Figs. 4 and 5 are vertical transverse sections in the correspondingly numbered lines in Fig. 3. Fig. 6 is a fragmentary horizontal section taken in line 6—6, Fig. 4, looking downwardly. Fig. 7 is a fragmentary horizontal section taken in the same line but looking upwardly.

Similar letters of reference indicate corresponding parts throughout the several views.

A represents the main frame of the machine which may be of any suitable construction to support the different working parts of the machine. Movable lengthwise of the frame is a carrier which is adapted to receive the lumps or balls of dough $a$ and present them successively to the means whereby the longitudinal grooves or indentations are produced in the same, preparatory to setting them away and baking them. This carrier preferably comprises an endless belt or apron B which has an upper horizontal operative portion and a lower horizontal idle portion and passes with its receiving end around a receiving pulley or roller C mounted on the rear end of the machine while its front or delivery end passes around a delivery roller or wheel $C^1$ mounted on the corresponding end of the frame. This carrier apron may be driven in any suitable manner but preferably by means of a driving belt which is adapted to pass around one or another face of a cone pulley $d$ on one end of the shaft which carries the delivery pulley of the apron. For the purpose of taking up the slack in the apron and keeping the same tight, the shaft of the receiving roller C is mounted at opposite ends in bearings $c$ which are slidable in horizontal ways $e$ formed on the main frame and are moved rearwardly or in the direction for tightening the apron by means of adjusting screws $f$ arranged in internally screw threaded lugs or ears F on the frame and engaging with the bearings $c$, as shown in Figs. 1 and 3. As the operative upper part of the apron moves forwardly, it is supported on its underside by the front and rear sections G, $G^1$ of a table which engages with the underside of this part of the apron and prevent downward deflection thereof by reason of the lumps of dough which are placed thereon by the operator and which are subjected to a downward pressure by the means which produce the longitudinal grooves or indentations therein. The belt or apron is held flat and prevented from curling up at its edges or becoming uneven by means of a plurality of distending or retaining plates or bars H which are secured transversely at uniform intervals to the outer side of the apron, these plates being preferably constructed of metal and secured to the apron by means of rivets or otherwise.

Although the means whereby the grooving or indenting of the lumps or balls of dough may be variously constructed, the means for this purpose shown in the drawings are suitable and are constructed as follows: Above the front section G of the apron supporting table is arranged a vertically rotatable reel comprising a horizontal shaft $i$ which is journaled transversely in bearings formed in standards $j$ rising from opposite sides of the frame, two spiders secured to the shaft $i$ adjacent to the inner sides of the standards and each provided with a plurality of radial equidistant arms $k$ and a plurality of pinning rollers or bars $l$ arranged in an annular concentric row about the axis of the reel and each pivoted at its opposite ends on the outer ends of a pair of corresponding arms $k$ of the spiders. This reel is rotated in the direction for causing the side facing the top of the apron to move in the same direction and in unison therewith. This movement of the reel may be produced in any suitable way but is preferably derived from the motion of the apron by the means shown in the drawings which comprise a plurality of tappets or shifting fingers M arranged on the outer side of the apron adjacent to one edge thereof and each mounted on the front end of a longitudinal supporting rod m which is secured at its rear end to the outer side of the next following distending or retaining plate H on the apron. As the tappets move forwardly with the apron the same engage successively with the rollers of the reel, whereby the same is rotated in the same measure as the apron advances, this operation being substantially the same as the rotation of a pinion by means of a gear rack.

The lumps or balls of dough which are to be indented or grooved are placed successively upon the upper side of the apron at suitable intervals and preferably two abreast, because this permits of employing both hands of the operator to advantage. These lumps or balls are so placed upon the apron that the same upon being moved forward past the reel are engaged successively on their upper sides by the pinning rollers or bars of the reel, each of these rollers or bars engaging with a pair of dough balls and indenting the same simultaneously. In order to enable the operator to place the dough balls upon the apron in the proper position to be engaged by the pinning rolls gaging means are provided which preferably consist of a plurality of upright plates N which are secured transversely and at uniform intervals to the outer side of the apron, so that they project laterally from the apron and their rear sides may be engaged by the lumps of dough and serve as a gage therefor. As the attendant places the lumps of dough on the apron next to the gage face on the rear side of the gage plates and they are carried forward by the apron, these lumps will be presented properly to the pinning rollers or bars of the reel which approach the apron immediately in rear of each gage plate and in the proper relation thereto to produce the indentations or grooves in the lumps of dough substantially in the center thereof.

In order to permit of properly indenting or grooving lumps or balls of dough of different sizes, so that the groove or dent is arranged in the center thereof, means are provided for adjusting the gage plates in a direction lengthwise of the movement of the apron, so that the gage face of these plates can be adjusted to suit different sizes of dough balls or lumps. A simple means for effecting this adjustment of the gage plates consists in arranging the same upon the rear edge of a horizontal adjusting plate or flange n which is adjustably secured to the upper side of an adjacent distending plate H by means of bolts $n^1$ secured to the distending plate and passing through longitudinal slots $n^2$ in the adjusting flange or plate, as shown in Fig. 3. Upon loosening the bolts $n^1$, the adjusting plates and gage plates may be moved lengthwise of the apron to the desired position and after adjustment the same are held in place by tightening these bolts.

For the purpose of preventing the reel from being thrown out of line with the apron when the pinning rollers or bars are engaged by the tappets, means are provided for producing a braking or retarding action upon the reel which preferably consists of a brake, drum, or reel O secured to one end of the reel shaft, a brake band $o^1$ engaging with the outer side of said drum and rigidly secured at one end to a lug $o^2$ on the adjacent standard and a screw nut $o^3$ arranged on a threaded shank $o^4$ on the opposite end of said brake band and engaging with a lug or bracket $o^5$ on the adjacent standard, as shown in Figs. 1, 3 and 4. By tightening or loosening the nut $o^3$ sufficient pressure of the band may be exerted on the drum to permit the reel to be turned by engagement of the tappets with the pinning rollers but preventing the blow of these tappets against these rollers from displacing the reel relatively to the apron.

The depth of the groove or indentation which is produced in the lumps of dough is determined according to whether the dough is comparatively soft or hard. When the dough is soft, a comparatively shallow indentation or groove is produced in the lumps or balls of dough, whereas if the dough is hard the indentation or grooves in the balls are made deeper so as to allow for the greater resilience of the dough which tends to restore the same to its normal condition. To permit of thus indenting the lumps of dough shallow or deep according to the plasticity of the dough, the pinning rollers or bars while moving past the face of the operative side of the apron are caused to approach more or less closely to said face of the apron. For this purpose the front section G of the table is made vertically adjustable on the frame toward and from the indenting mechanism, this adjustment being preferably effected by means of slides P arranged on opposite sides of the table section G and moving vertically in grooves or guideways p on the frame, an upright adjusting screw $p^1$ secured at its upper end to the underside of the front table section, a horizontally rotatable beveled gear wheel Q journaled on a bearing on the main frame and provided in its hub with a screw nut q which receives the lower threaded end of the adjusting screw, and a horizontal shaft R journaled transversely in bearings on the lower part of the frame and provided with the bevel gear wheel $r$ meshing with the bevel gear wheel Q and having a hand wheel $r^1$ at one end for turning the shaft and the parts connected therewith. Upon turning the hand wheel in one direction the front table section will be raised by the intermediate mechanism, thereby causing the lumps of dough to be brought closer to the pinning rollers or bars for producing comparatively deep grooves or indentations in the lumps or balls such as are required when the dough is comparatively hard. But when the hand wheel is turned in the opposite direction, the front table section is lowered so that the lumps or balls of dough are presented to the pinning rollers at a greater distance therefrom, thereby causing indentations or grooves of lesser depth to be produced in the same suitable for comparatively soft dough.

The rear section $G^1$ of the table is rigid and permanently secured to the adjacent part of the main frame. While the apron is traveling over this part of the table the lumps or balls of dough are placed transversely in pairs on the apron by the baker. Before those parts of the apron which are adapted to receive the dough balls or lumps reach the place where the baker deposits the same on the apron, these places or parts of the apron are dusted or spread with flour, so as to prevent the dough from adhering thereto as is commonly done in baking. The means for this purpose are arranged in rear of the place where the baker deposits the dough balls on the apron and are preferably constructed as follows: S represents a flour holder, sifter or receptacle which is preferably constructed in the form of a trough which is arranged horizontally above the receiving part of the apron and has an open top to permit of filling the same with flour while its bottom is provided with a transverse row of perforations $s$ through which the flour is sifted or discharged at intervals in small quantities upon the apron below the same. This flour holder is pivoted at its opposite ends on standards or uprights $t$ rising from the main frame so that the flour holder or sifter is turned in a vertical plane lengthwise of the apron. The rearward movement of the flour holder or sifter is limited by means of stops $u$ secured thereto and adapted to engage with the front side of the adjacent standards. These stops are yieldingly held in engagement with said standards by means of a spring U connecting one of said stops with the adjacent standard. On its front side the flour holder or sifter is provided with a depending trip arm $v$ which normally projects downwardly into the path of the gage plates on the apron. Each gage plate during its forward movement with the apron engages with the trip arm and causes the flour holder or sifter to be turned forwardly in opposition to the spring until the gage plate passes beyond the trip arm. The instant this trip arm clears the gage plate the spring U quickly returns the flour holder or sifter to its rearmost position during which movement its stops $u$ strike the standards and cause the flour holder or sifter to be jarred, so that a quantity of the flour contained therein is discharged through the openings in the bottom thereof and upon that portion of the apron below the same. The mechanism for operating this flour sifting device is so timed that the flour is delivered immediately in the rear of each gage plate upon the apron where the lumps or dough are deposited by the baker for presentation to the mechanism which produces the indentations or grooves thereon.

After the lumps of dough have been operated upon by the grooving or indenting mechanism, they are discharged upon a receiving table W which is preferably arranged in a forwardly inclined position on the main frame in front of the delivery roller and below the same and has an upwardly projecting rim or flange $w$ at its lower or front edge. The lumps of dough are not discharged from the apron until the latter passes below the center of the delivery roller and commences its rearward or idle movement inasmuch as these lumps or balls are held in place on the belt up to this time by means of the gage plates projecting therefrom. But as the gage plates pass below the center of the delivery roller or wheel the lumps of dough are no longer supported and are caused to fall from the same and the apron with the upper side down on the receiving table. It is in this position that the pinned or grooved lumps or balls of dough are set away in pans or otherwise to permit the second raising or proving to take place before the baking operation and it is therefore unnecessary for the baker when removing the rolls from the table to first reverse them before setting them away, thereby expediting the operation accordingly.

It will be noted that this roll pinning machine is very simple in construction, reliable in operation, not liable to get out of order, has a large capacity, requires but little room for its installation and needs but a small amount of power for its operation.

I claim as my invention:

1. A roll pinning machine comprising indenting means for producing indentations in balls of dough and having a rotatable support and a plurality of rollers or bars which are mounted on said support and which are adapted to be moved successively into operative position, and means for presenting balls of dough successively to said rollers or bars.

2. A roll pinning machine comprising a rotatable reel provided with a plurality of indenting rolls or balls arranged in an annular row and adapted to produce indentations in balls of dough, an endless apron adapted to receive said balls of dough and present the same successively to said rollers or bars, and means for actuating said reel by the movement of said apron.

3. A roll pinning machine comprising a rotatable reel provided with a plurality of indenting rolls or balls arranged in an annular row and adapted to produce indentations in balls of dough, an endless apron adapted to receive said balls of dough and present the same successively to said rollers or bars, and means for actuating said reel by the movement of said apron comprising tappets arranged on the apron and adapted to engage successively with said rollers or bars.

4. A roll pinning machine comprising a rotatable reel having a plurality of indenting rollers or bars arranged in an annular row, a carrier for presenting balls of dough successively to said indenting rollers or bars, means for rotating said reel by motion derived from said apron, and means for retarding the movement of said reel.

5. A roll pinning machine comprising a rotatable reel having a plurality of indenting rollers or bars arranged in an annular row, a carrier for presenting balls of dough successively to said indenting rollers or bars, means for rotating said reel by motion derived from said apron, and means for retarding the movement of said reel comprising a drum rotating with said reel, and a brake band engaging with said drum and connected with a stationary part of the machine.

6. A roll pinning machine comprising means for indenting rolls of dough, an endless apron whereby said balls are presented successively to said indenting means, and a vertically adjustable platen which supports said apron below said indenting means.

7. A roll pinning machine comprising means for indenting rolls of dough, an endless apron whereby said balls are presented successively to said indenting means, a vertically adjustable platen which supports said apron below said indenting means, and means for adjusting said platen comprising an upright screw connected at its upper end with said platen, a bevel gear wheel having a screw nut which receives said screw, and a horizontal shaft provided with a bevel gear wheel meshing with the first mentioned bevel wheel and a hand wheel.

8. A roll pinning machine comprising indenting means for producing indentations in balls of dough, an endless apron which receives said balls and presents the same successively to said indenting means, and means for dusting flour on said apron in advance of receiving said balls of dough comprising a vertically swinging flour holder arranged above the receiving part of the apron and having discharge perforations in its bottom, a stop which limits the backward movement of the flour holder, a spring which retains said holder yieldingly in its rearmost position, an arm depending from said holder, and a plurality of plates arranged on the apron and adapted to engage successively with said arm and move the holder forwardly.

Witness my hand this 3rd day of July, 1909.

FRED P. HOFFMAN.

Witnesses:
 THEO. L. POPP,
 ANNA HEIGIS.